Patented July 18, 1939

2,166,661

UNITED STATES PATENT OFFICE 2,166,661

INSECTICIDES AND METHODS OF MAKING SAME

Carl P. Hopkins, Grand Junction, Colo., assignor to The Latimer-Goodwin Chemical Company, Grand Junction, Colo., a corporation of Colorado No Drawing. Application June 12, 1937, Serial No. 147,991

8 Claims. (Cl. 167—33)

For insecticidal usages nicotine has long been in particular demand. It is effective against aphidic types of pests, and is easily applied in aqueous sprays. It is though in relatively limited supply and is expensive. I have now found however, that an insecticide of like activity and effectiveness can be made synthetically, and with the further advantage of being applicable in wide usage without undue expense.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Illustrative of the invention, on reacting propylene with lutidine and sulphur, a product is formed which is in general characterized by a molecular structure involving the radicals concerned and containing a high per cent of combined sulphur, viz., approximately 27 per cent. While the exact molecular arrangement is difficult to ascertain, an alkylene pyridyl sulphide is formed, and the indications are that the reaction course is about as follows:

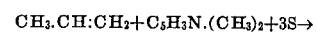

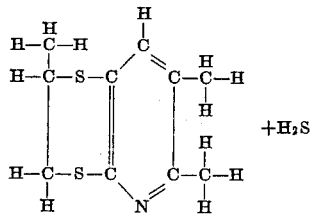

Whether the precise structure of the product thus is correct in its detail is not material; the theoretical sulphur content 26.5 per cent closely approximates the obtained per cent above-mentioned however, and the properties of the compound otherwise agree consistently. Such product is characterized by excellent high efficacy against aphids and the like, and its compatibilities are such that it can be very readily applied in usage. Instead of propylene, I may employ other unsaturated hydrocarbons, aliphatic or aromatic, and instead of the lutidine I may employ pyridine and its homologues generally. Operation with all of the various raw materials available, shows that the reaction characteristic is general and the products are valuable insecticides, detailed differences contingent upon the particular raw materials employed lying merely in the physical properties, degrees of viscosity and insecticidal effectiveness, etc. Thus, a reaction of unsaturated hydrocarbons with a pyridine type material and sulphur, the reaction being obtained by heating the materials together, provides in general the desired products here concerned. With particular convenience, unsaturated hydrocarbons as in cracked petroleum oils, shale oils, etc., and tar distillates may be used. In some shale oils unsaturates and pyridine bases are both available. The time required to complete the reaction between any particular mixture of unsaturated hydrocarbons, pyridine compounds and sulphur depends upon the character of the percentage of the components in any given instance. If desired, a catalyst, and increased pressure may be employed. But by employing vacuum distillation, products of high purity may be obtained. In commercial operation however, unreacted hydrocarbons need not be removed from the reaction mass.

As an example: 200 parts by weight of kerosene containing 36 per cent of unsaturates, 30 parts by weight of pyridine and 12 parts by weight of sulphur are heated in a receptacle provided with a condenser, the temperature being held at around 140° C. for about 4 hours. Some unreacted hydrocarbons are collected as distillate. None of the pyridine nor any essential amount of sulphur goes over however. The material left in the reaction vessel is a dark viscous liquid with high combined sulphur content.

Other sources of unsaturates, such as shale distillates etc., supplemented to the extent necessary with additional sources of pyridine bases may be operated similarly.

One part of the reaction material as thus formed, is dissolved in a convenient hydrocarbon solvent, such as kerosene, distillate, etc., for instance about 9 parts, and is emulsified with a suitable soap, as a fatty acid soap. Spray solutions made by diluting this with water at the rate of one-half gallon to 100 gallons of water, and 1 gallon to 100 gallons of water, tested on aphids and two-spotted mites have shown the following results:

| Dilution, percent | Percent of kill | |
|---|---|---|
| | Aphids | Mites |
| 0.5 | 75 | 75 |
| 1.0 | 98 | 90 |

The latter concentration represents 1 part of active ingredient in 1000 parts of water, and the results are comparable with those obtained with nicotine in the same concentration applied to aphids. The reaction product made from cracked petroleum was in fact found to kill both aphids and mites at the rate of 95 per cent when used in 0.35 per cent concentration. At even 1 part to 1000 parts there is no injurious effect on foliage.

The emulsions are compatible with other insecticides, such as lead arsenate, calcium arsenate, cryolite, etc., and in such combinations notably increase the total effectiveness because of the ovicidal properties of the alkyl pyridyl disulphide.

Other modes of applying the principle of the invention may be employed, change being made as regards the details described, provided the features stated in any of the following claims, or the equivalent of such, be employed.

I therefore particularly point out and distinctly claim as my invention:

1. An insecticide, comprising a reaction product of propylene and lutidine and sulphur.

2. An insecticide, comprising a reaction product of olefinic and pyridinic compounds and sulphur.

3. An insecticide, comprising a reaction product of a pyridinic compound and sulphur with a reactive member from the group consisting of petroleum, shale oils and tar distillates containing reactive unsaturated hydrocarbons.

4. An insecticide, comprising a reaction product of a pyridinic compound and sulphur with kerosene containing unsaturated hydrocarbons.

5. In a process of making an insecticide, heating propylene and lutidene and sulphur together.

6. In a process of making an insecticide, heating olefinic and pyridinic compounds and sulphur together.

7. In a process of making an insecticide, heating a pyridinic compound and sulphur with a reactive member from the group consisting of petroleum, shale oils and tar distillates containing reactive unsaturated hydrocarbons.

8. In a process of making an insecticide, heating a pyridinic compound and sulphur with kerosene containing unsaturated hydrocarbons.

CARL P. HOPKINS.